United States Patent
Li et al.

(10) Patent No.: US 11,476,063 B2
(45) Date of Patent: Oct. 18, 2022

(54) TOUCHPAD DEVICE

(71) Applicant: Chicony Electronics Co., Ltd., New Taipei (TW)

(72) Inventors: Po-Hsin Li, New Taipei (TW); Po-Chun Hou, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 120 days.

(21) Appl. No.: 17/035,747

(22) Filed: Sep. 29, 2020

(65) Prior Publication Data
US 2021/0375562 A1 Dec. 2, 2021

(30) Foreign Application Priority Data

Jun. 1, 2020 (TW) ................... 109118364

(51) Int. Cl.
*G06F 3/0354* (2013.01)
*H01H 13/50* (2006.01)
*G06F 1/16* (2006.01)

(52) U.S. Cl.
CPC ........... *H01H 13/50* (2013.01); *G06F 1/1681* (2013.01); *G06F 3/03547* (2013.01); *H01H 2215/004* (2013.01); *H01H 2237/004* (2013.01)

(58) Field of Classification Search
CPC .. G06F 1/1681; G06F 3/03547; G06F 1/1616; G06F 1/684; H01H 2215/004; H01H 2237/004; H01H 2221/016; H01H 2221/044; H01H 21/22; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 13/50; H01H 2003/466
See application file for complete search history.

(56) References Cited

U.S. PATENT DOCUMENTS

| 6,747,867 B2 * | 6/2004 | Hsu ........................ G06F 1/1616 |
| | | 361/679.08 |
| 2017/0024029 A1 * | 1/2017 | Kitamura ................ G06F 1/169 |

FOREIGN PATENT DOCUMENTS

TW 201633042 A 9/2016

* cited by examiner

*Primary Examiner* — Ahmed M Saeed
(74) *Attorney, Agent, or Firm* — CKC & Partners Co., LLC

(57) ABSTRACT

A touchpad device includes a bottom board, at least one supporting board, a circuit board, a first extending structure, and a second extending structure. The bottom board is configured to be fixed to a housing. The supporting board is coupled to the bottom board and configured to swing relative to the bottom board. The circuit board is attached to a side of the supporting board away from the bottom board. The first extending structure is disposed on the bottom board and extends toward the supporting board. The second extending structure is disposed on the supporting board and extends toward the bottom board. The first extending structure partially extends to a side of the second extending structure adjacent to the supporting board, or the second extending structure partially extends to a side of the first extending structure adjacent to the bottom board.

18 Claims, 11 Drawing Sheets

TOUCHPAD DEVICE

CROSS-REFERENCE TO RELATED APPLICATION

This application claims priority to Taiwan Application Serial Number 109118364, filed Jun. 1, 2020, which is herein incorporated by reference.

BACKGROUND

Technical Field

The present disclosure relates to a touchpad device.

Description of Related Art

With advancements of technology, touchpad devices have been widely used in various portable electronic products such as notebook computers, tablet computers, and personal digital assistants. A touchpad device senses the movement of a user's finger to make the cursor move correspondingly. Therefore, the touchpad device can replace the mouse as an input and operation device.

In order to provide users with the function of generating click commands by pressing, the operating principles of conventional touchpad devices are usually to act in the form of a hinge structure. The source of the overall rigidity of a conventional stacking type touchpad device is mainly the circuit board itself, or a material with higher hardness, such as glass or metal, need to be applied on or under the circuit board. However, as the designs of various electronic devices nowadays tend to be lighter, thinner, shorter and smaller, since the circuit board and other stacked layers need to be thinned, the touchpad device has the problem of insufficient rigidity at corners. In addition, the design of the fixed side of the conventional stacking type touchpad device has a great influence on the overall throughput rate. If the tolerances of manufacturing processes and materials are too large, the product stability will be poor. For example, noise may be easily generated during use.

Accordingly, how to provide a touchpad device to solve the aforementioned problems becomes an important issue to be solved by those in the industry.

SUMMARY

An aspect of the disclosure is to provide a touchpad device that can efficiently solve the aforementioned problems.

According to an embodiment of the disclosure, a touchpad device includes a bottom board, at least one supporting board, a circuit board, a first extending structure, and a second extending structure. The bottom board is configured to be fixed to a housing. The at least one supporting board is coupled to the bottom board and configured to swing relative to the bottom board. The circuit board is attached to a side of the bottom board away from the at least one supporting board. The first extending structure is disposed on the bottom board and extends toward the at least one supporting board. The second extending structure is disposed on the at least one supporting board and extends toward the bottom board. The first extending structure partially extends to a side of the second extending structure adjacent to the at least one supporting board, or the second extending structure partially extends to a side of the first extending structure adjacent to the bottom board.

In an embodiment of the disclosure, at least one of the first extending structure and the second extending structure is an elastic arm structure.

In an embodiment of the disclosure, the at least one supporting board includes a reverse bending portion.

In an embodiment of the disclosure, the touchpad device further includes a hinge structure connected between the bottom board and the at least one supporting board. The hinge structure and the reverse bending portion are respectively located at opposite two edges of the at least one supporting board.

In an embodiment of the disclosure, the touchpad device further includes a hinge structure. The hinge structure includes a first abutting portion and a second abutting portion. The first abutting portion is disposed on the bottom board and extends toward the at least one supporting board. The second abutting portion is disposed on the at least one supporting board and extends toward the bottom board. The first abutting portion abuts against a side of the second abutting portion adjacent to the at least one supporting board, and the second abutting portion abuts against a side of the first abutting portion adjacent to the bottom board.

In an embodiment of the disclosure, at least one of the first abutting portion and the second abutting portion is an elastic arm structure.

In an embodiment of the disclosure, the touchpad device further includes a first retaining portion and a second retaining portion. The first retaining portion is disposed on the bottom board. The second retaining portion is disposed on the at least one supporting board and arranged with the first retaining portion in a direction substantially parallel to the bottom board or the at least one supporting board.

In an embodiment of the disclosure, the at least one supporting board includes a first supporting board and a second supporting board. The first supporting board is coupled to the bottom board and attached to a side of the circuit board adjacent to the bottom board. The second supporting board is attached to the side of the circuit board adjacent to the bottom board.

In an embodiment of the disclosure, the second supporting board is partially overlapped between the circuit board and the first supporting board.

In an embodiment of the disclosure, the first supporting board and the second supporting board are arranged side by side in a direction substantially parallel to the circuit board.

In an embodiment of the disclosure, one of the first supporting board and the second supporting board includes a reverse bending portion.

In an embodiment of the disclosure, the touchpad device further includes a hinge structure connected between the bottom board and the first supporting board. The hinge structure and the reverse bending portion are respectively adjacent to opposite two edges of the bottom board.

In an embodiment of the disclosure, the touchpad device further includes a hinge structure. The hinge structure includes a cantilever connected to the at least one supporting board and includes a fixing portion. The fixing portion is located at a distal end of the cantilever and fixed to the bottom board.

In an embodiment of the disclosure, the hinge structure further includes a fastening member. The fastening member fastens the fixing portion and the bottom board.

In an embodiment of the disclosure, the touchpad device further includes a linkage. The linkage includes a plurality of first engaging portions and a plurality of second engaging portions respectively located at opposite two sides of the linkage. The first engaging portions are engaged with the bottom board. The second engaging portions are engaged with the at least one supporting board.

In an embodiment of the disclosure, the bottom board has a plurality of engaging holes. The first engaging portions are respectively engaged with the engaging holes.

In an embodiment of the disclosure, the at least one supporting board has a plurality of engaging holes. The second engaging portions are respectively engaged with the engaging holes.

In an embodiment of the disclosure, the at least one supporting board further includes a plurality of pressing arms. The pressing arms respectively press the second engaging portions.

In an embodiment of the disclosure, a metal dome is disposed on the circuit board. The at least one supporting board includes a buffering cover. The buffering cover protrudes away from the circuit board and covers the metal dome.

In an embodiment of the disclosure, the bottom board has a through hole. The buffering cover is located between the metal dome and the through hole.

Accordingly, in the touchpad device of the present disclosure, by using extending structures respectively disposed on the bottom board and the supporting board as height-limiting structures, the gap between the bottom board and the supporting board can be controlled, and the problem of uneven force caused by deformation of components can be reduced. By designing the extending structures as elastic arm structures, the problem of excessive stress of the metal dome can also be alleviated, thereby improving the pressing feeling at the area of the metal dome. By designing the abutting portions of the hinge structure respectively disposed on the bottom board and the supporting board as elastic arm structures, the problem of the gap between the bottom board and the supporting board, the problem of noise, and the problem of the pressing feeling can be improved. By providing the linkage to engage the bottom board and the supporting board at the movable side of the touchpad device, the problem of deformation or insufficient rigidity of components can be improved. By designing the pressing arm on the supporting board to abut against the linkage, the impact noise between the linkage and the supporting board can be eliminated. By designing the buffering cover on the supporting board to cover the metal dome, the rebound sound of the metal dome can be reduced. By arranging the through hole on the bottom board to directly face the buffering cover, the impact sound of pressing can be reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
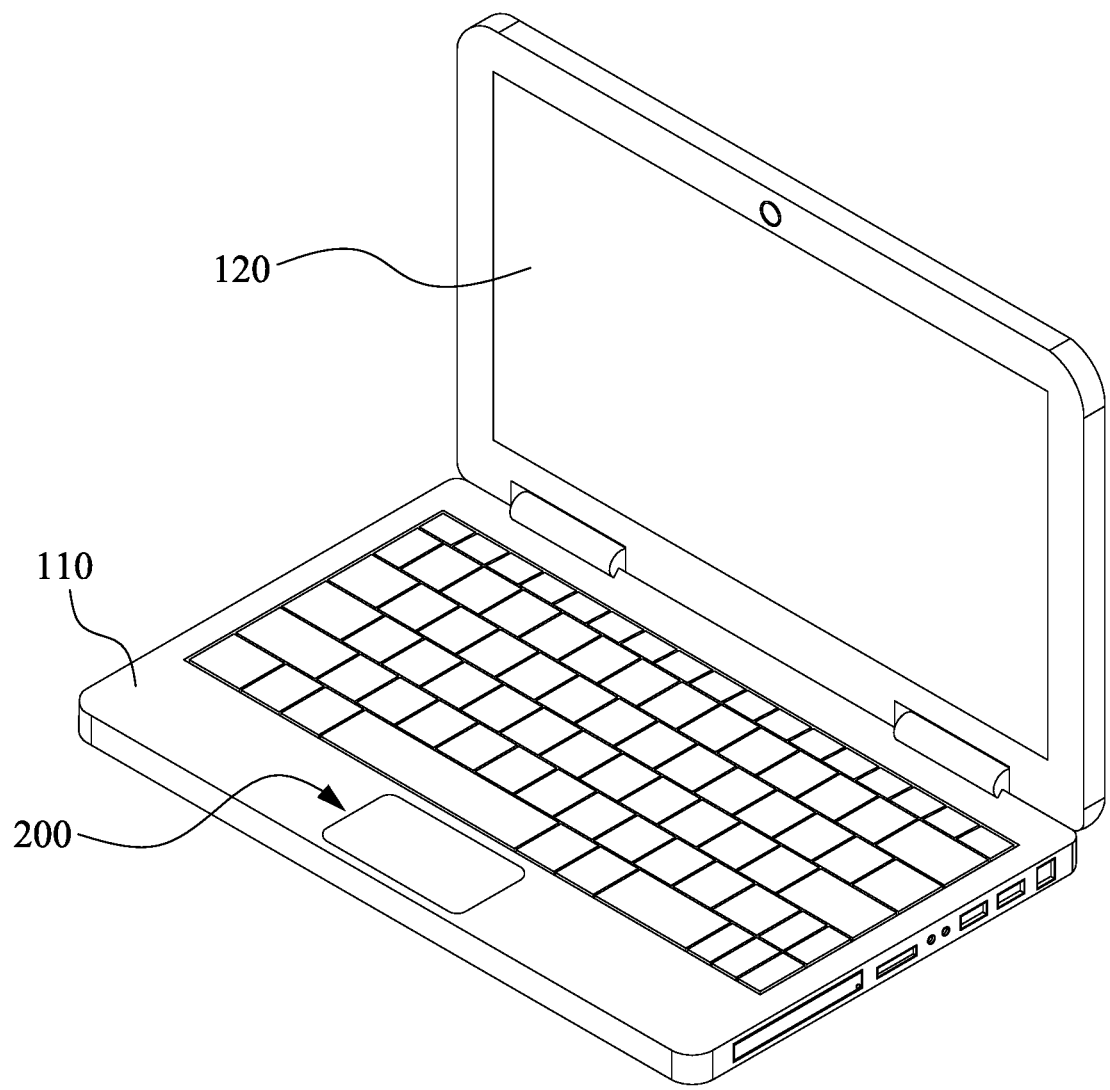
FIG. 1 is a perspective view of an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an electronic device 100 according to an embodiment of the disclosure. As shown in FIG. 1, in the present embodiment, the electronic device 100 includes a host 110, a display 120, and a touchpad device 200. The touchpad device 200 is an input device disposed in the host 110, but the disclosure is not limited in this regard. In practical applications, the touchpad device 200 may also be an electronic product (e.g., a personal digital assistant, a keyboard including a touchpad, etc.) using a touchpad as an input or operation interface. In other words, the concept of the touchpad device 200 of the present disclosure can be applied to any electronic product that uses a touchpad as an input or operation interface. Structures and functions of certain components included in the touchpad device 200 and connection and operation relationships among these components will be described in detail below.

Figure 2A:
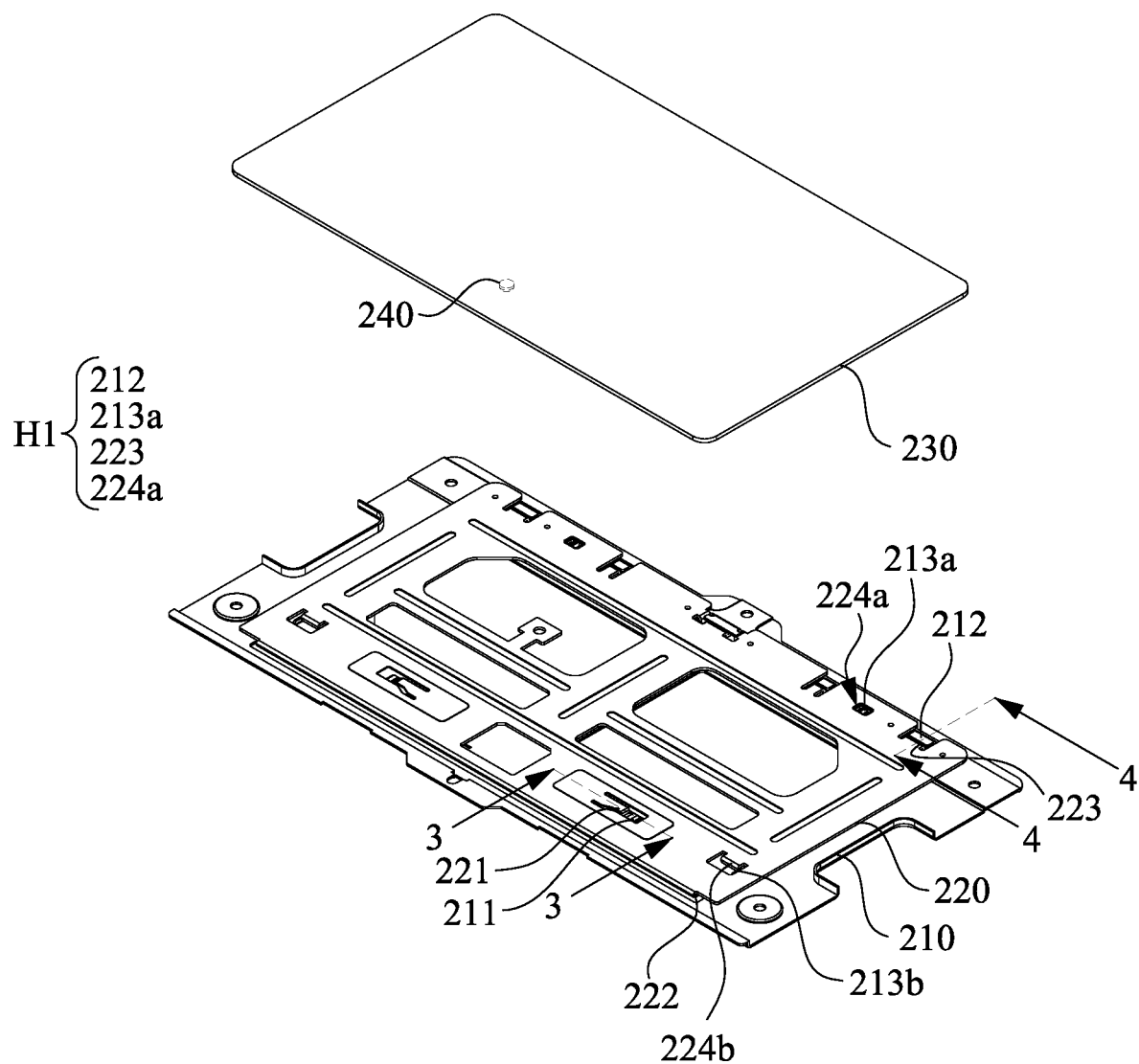
FIG. 2A is a perspective view of a touchpad device in FIG. 1, in which a circuit board is separated upward.
Figure 2B:
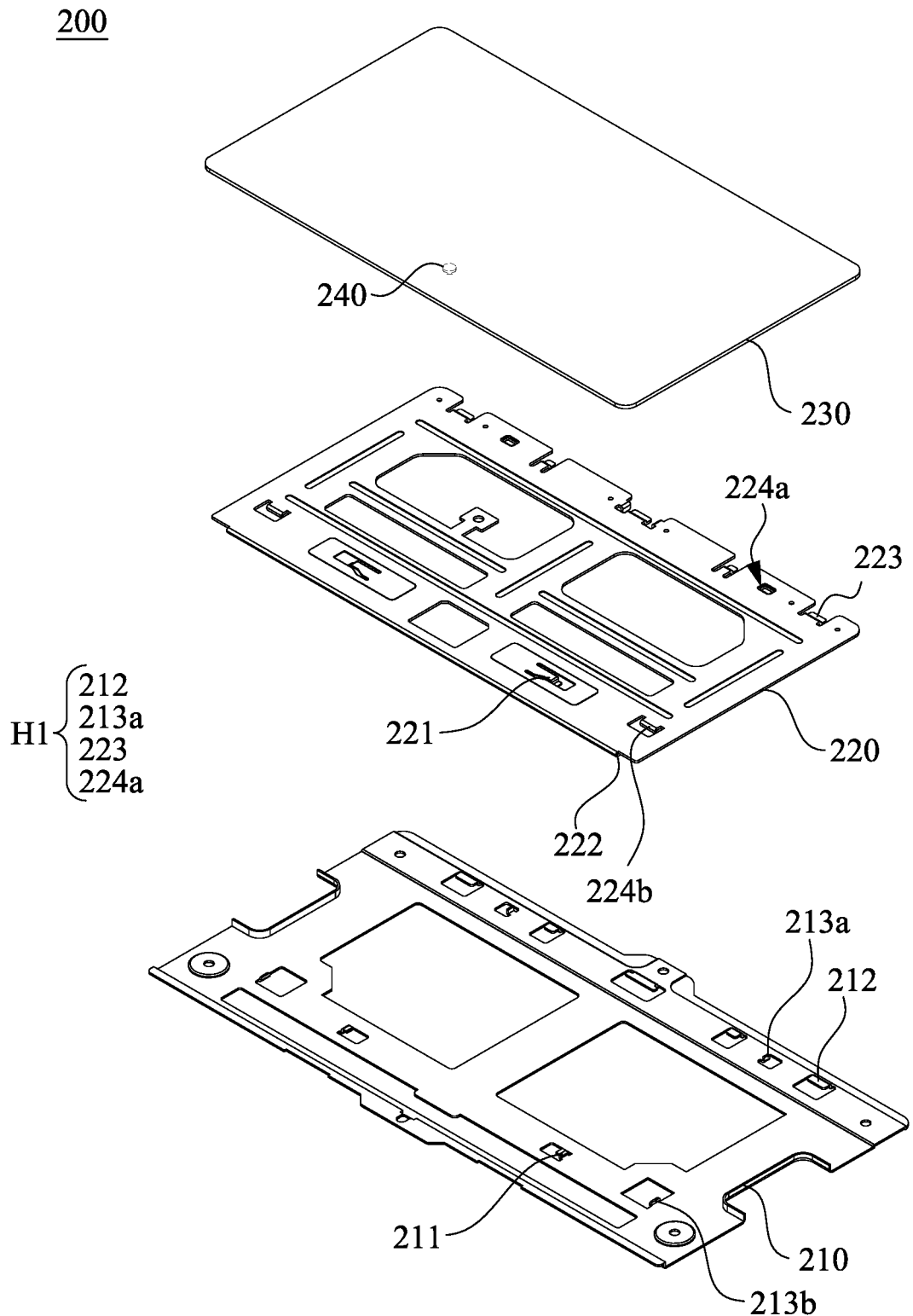
FIG. 2B is an exploded view of the touchpad device in FIG. 2A.

Reference is made to FIGS. 2A and 2B. FIG. 2A is a perspective view of the touchpad device 200 in FIG. 1, in which a circuit board 230 is separated upward. FIG. 2B is an exploded view of the touchpad device 200 in FIG. 2A. In the present embodiment, the touchpad device 200 includes a bottom board 210, a supporting board 220, and a circuit board 230. The bottom board 210 is configured to be fixed to a housing of the host 110. The supporting board 220 is coupled to the bottom board 210 and configured to swing relative to the bottom board 210. The circuit board 230 is attached to a side of the supporting board 220 away from the bottom board 210.

Figure 3:
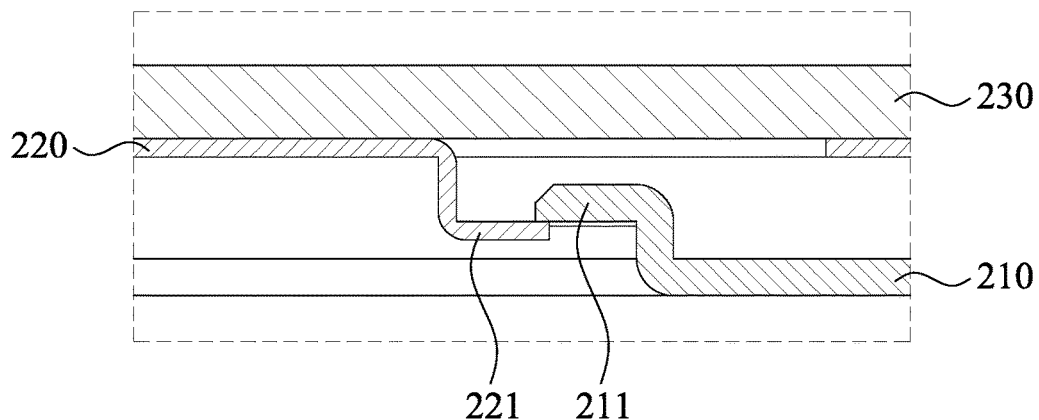
FIG. 3 is a partial cross-sectional view of the touchpad device in FIG. 2A taken along line 3-3.

Reference is made to FIG. 3. FIG. 3 is a partial cross-sectional view of the touchpad device 200 in FIG. 2A taken along line 3-3. As shown in FIGS. 2A to 3, in the present embodiment, the touchpad device 200 further includes at least one set of combination consisting of a first extending structure 211 and a second extending structure 221. The first extending structure 211 is disposed on the bottom board 210 and extends toward the supporting board 220. The second extending structure 221 is disposed on the supporting board 220 and extends toward the bottom board 210. The first extending structure 211 partially extends to a side of the second extending structure 221 adjacent to the supporting board 220, or the second extending structure 221 partially extends to a side of the first extending structure 211 adjacent to the bottom board 210. For example, in some embodiments, as shown in FIG. 3, the first extending structure 211 is L-shaped, in which one end is connected to the bottom board 210 and another end extends to a side of the second extending structure 221 adjacent to the supporting board 220. In some embodiments, as shown in FIG. 3, the second extending structure 221 is L-shaped, in which one end is connected to the supporting board 220 and another end extends to a side of the first extending structure 211 adjacent to the bottom board 210. However, in practical applications, at least one of the first extending structure 211 and the second extending structure 221 can also be changed to other shapes, such as C-shape, S-shape, Z-shape, and etc.

With the foregoing structural configurations, the first extending structure 211 and the second extending structure 221 can serve as height-limiting structures between the bottom board 210 and the supporting board 220, so the gap between the bottom board 210 and the supporting board 220 can be controlled, which is related to the pressing feeling of the touchpad device 200. In addition, by adjusting the relative position of two sets of the combination of the first extending structures 211 and the second extending structure 221, the problem of uneven forces caused by deformation of components (e.g., the circuit board 230) can also be reduced.

As shown in FIG. 2A, a metal dome 240 (indicated by a dotted line in the figure) is disposed on the circuit board 230. When the user presses the circuit board 230 toward the bottom board 210, the metal dome 240 is squeezed and deformed by the bottom board 210, and a circuit switch (not shown) on the circuit board 230 is triggered, thereby correspondingly generating a pressing signal. In some embodiments, at least one of the first extending structure 211 and the second extending structure 221 is an elastic arm structure. Hence, when the circuit board 230 is pressed toward the bottom board 210, the elastic force provided by the first extending structure 211 and the second extending structure 221 can alleviate the problem of excessive stress of the metal dome 240, thereby improving the pressing feeling at the area of the metal dome 240.

In some embodiments, the bottom board 210 is a metal board, and the first extending structure 211 and the bottom board 210 may integrally form a unitary structure, but the disclosure is not limited in this regard. For example, the first extending structure 211 may be a structure manufactured by the bottom board 210 through a stamping process.

In some embodiments, the supporting board 220 and the second extending structure 221 can be made of different materials, and the second extending structure 221 can be embedded in a hollow of the supporting board 220, but the disclosure is not limited in this regard. For example, the material of the supporting board 220 may include plastic, and the material of the second extending structure 221 may include metal.

In some embodiments, polyester resin (Mylar) may be additionally attached to the top of the circuit board 230 for the user's finger to touch, but the disclosure is not limited in this regard.

Figure 4:
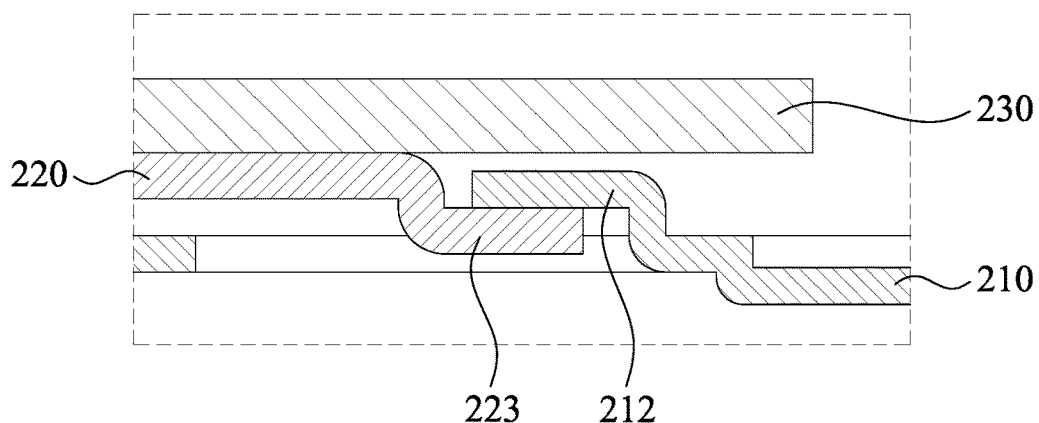
FIG. 4 is a partial cross-sectional view of the touchpad device in FIG. 2A taken along line 4-4.

Reference is made to FIG. 4. FIG. 4 is a partial cross-sectional view of the touchpad device 200 in FIG. 2A taken along line 4-4. As shown in FIGS. 2A, 2B, and 4, in the present embodiment, the touchpad device 200 further includes a hinge structure H1. The hinge structure H1 is connected between the bottom board 210 and the supporting board 220. Specifically, the hinge structure H1 includes a plurality sets of combination each consisting of a first abutting portion 212 and a second abutting portion 223. The first abutting portion 212 is disposed on the bottom board 210 and extends toward the supporting board 220. The second abutting portion 223 is disposed on the supporting board 220 and extends toward the bottom board 210. The first abutting portion 212 abuts against a side of the second abutting portion 223 adjacent to the supporting board 220, and the second abutting portion 223 abuts against a side of the first abutting portion 212 adjacent to the bottom board 210. For example, in some embodiments, as shown in FIG. 4, the first abutting portion 212 is L-shaped, in which one end is connected to the bottom board 210 and another end abuts against a side of the second abutting portion 223 adjacent to the supporting board 220. In some embodiments, as shown in FIG. 4, the second abutting portion 223 is L-shaped, in which one end is connected to the supporting board 220 and another end abuts against a side of the first abutting portion 212 adjacent to the bottom board 210. However, in practical applications, at least one of the first abutting portion 212 and the second abutting portion 223 can also be changed to other shapes, such as C-shape, S-shape, Z-shape, and etc. The plurality sets of combination of the first abutting portion 212 and the second abutting portion 223 are adjacent to one side of the touchpad device 200 and are substantially arranged along the side. The side of the touchpad device 200 provided with the hinge structure H1 can be regarded as a fixed side, and the other opposite side of the touchpad device 200 can be regarded as a movable side. Hence, the circuit board 230 can swing relative to the bottom board 210 with the hinge structure H1 as a fulcrum on the fixed side.

In some embodiments, at least one of the first abutting portion 212 and the second abutting portion 223 is an elastic arm structure. Hence, the problem of the gap between the bottom board 210 and the supporting board 220, the problem of noise, and the problem of the pressing feeling can be improved.

In some embodiments, the bottom board 210 is a metal board, and the first abutting portion 212 and the bottom board 210 may integrally form a unitary structure, but the disclosure is not limited in this regard.

In some embodiments, the material of the supporting board 220 may include plastic, and the second abutting portion 223 and the supporting board 220 may integrally form a unitary structure, but the disclosure is not limited in this regard. For example, the supporting board 220 and the second abutting portion 223 may be manufactured through an injection molding process.

As shown in FIGS. 2A and 2B, in the present embodiment, the touchpad device 200 further includes a plurality sets of combination each consisting of a first retaining portion 213a and a second retaining portion 224a. The sets of combination of the first retaining portion 213a and the second retaining portion 224a and the sets of combination of the first abutting portion 212 and the second abutting portion 223 are substantially linearly arranged along the fixed side of the touchpad device 200. The first retaining portion 213a is disposed on the bottom board 210. The second retaining portion 224a is disposed on the supporting board 220, and the second retaining portion 224a is laterally arranged with the first retaining portion 213a in a direction substantially parallel to the bottom board 210 or the supporting board 220. Hence, the sets of combination of the first retaining portion 213a and the second retaining portion 224a can position the supporting board 220 and the circuit board 230 thereon relative to the bottom board 210 in the horizontal direction at the fixed side of the touchpad device 200.

In some embodiments, the bottom board 210 is a metal board, and the first retaining portion 213a and the bottom board 210 may integrally form a unitary structure, but the disclosure is not limited in this regard.

In some embodiments, the material of the supporting board 220 may include plastic, and the second retaining portion 224a and the supporting board 220 may integrally form a unitary structure, but the disclosure is not limited in this regard.

In some embodiments, as shown in FIG. 2B, the first retaining portion 213a is a protruding piece protruding toward the supporting board 220, and the second retaining portion 224a is a hole configured for inserting the protruding piece, but the present disclosure is not limited in this regard.

As shown in FIGS. 2A and 2B, in the present embodiment, the touchpad device 200 further includes a plurality sets of combination each consisting of a third retaining portion 213b and a fourth retaining portion 224b. The sets of combination of the third retaining portion 213b and the fourth retaining portion 224b are adjacent to the movable side of the touchpad device 200 than the hinge structure H1. The third retaining portion 213b is disposed on the bottom board 210. The fourth retaining portion 224b is disposed on the supporting board 220 and laterally arranged with the third retaining portion 213b in a direction substantially parallel to the bottom board 210 or the supporting board 220. Hence, the sets of combination of the third retaining portion 213b and the fourth retaining portion 224b can position the supporting board 220 and the circuit board 230 thereon relative to the bottom board 210 in the horizontal direction at the movable side of the touchpad device 200.

In some embodiments, the bottom board 210 is a metal board, and the third retaining portion 213b and the bottom board 210 may integrally form a unitary structure, but the disclosure is not limited in this regard.

In some embodiments, the material of the supporting board 220 may include plastic, and the fourth retaining portion 224b and the supporting board 220 may integrally form a unitary structure, but the disclosure is not limited in this regard.

In some embodiments, as shown in FIG. 2B, the third retaining portion 213b is a protruding piece protruding toward the supporting board 220, and the fourth retaining portion 224b is a protruding piece protruding toward the bottom board 210, but the present disclosure is not limited in this regard.

Figure 5:
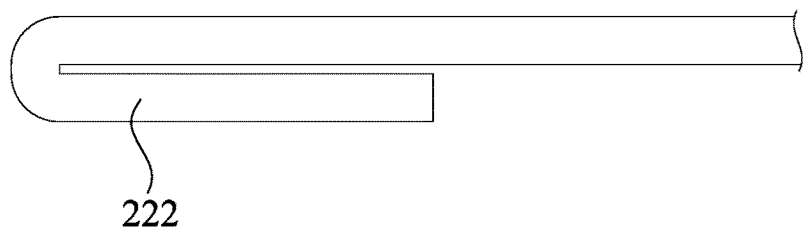
FIG. 5 is a partial side view of a supporting board in FIG. 2B.

Reference is made to FIG. 5. FIG. 5 is a partial side view of the supporting board 220 in FIG. 2B. As shown in FIGS. 2B and 5, the supporting board 220 includes a reverse bending portion 222. The hinge structure H1 and the reverse bending portion 222 are respectively located at opposite two edges of the supporting board 220. That is, the reverse bending portion 222 is located at the movable side of the touchpad device 200. Hence, the reverse bending portion 222 can reinforce the overall rigidity of the supporting board 220 by doubling the thickness after reversely-bending and forming a vertical structure with increased strength, thereby effectively solving the problem of insufficient rigidity at corners of the touchpad device 200.

Figure 6A:
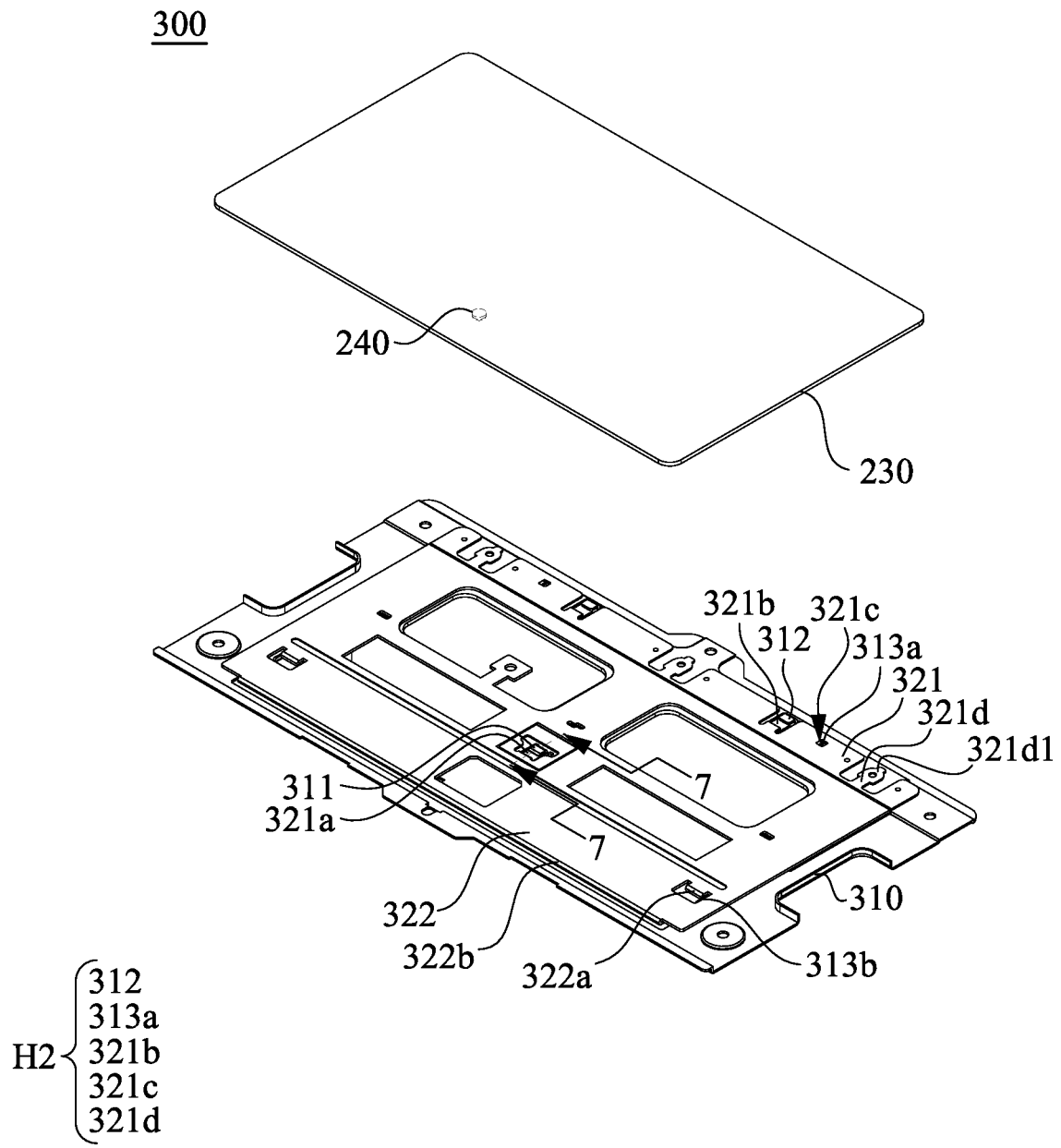
FIG. 6A is a perspective view of a touchpad device according to an embodiment of the disclosure, in which a circuit board is separated upward.
Figure 6B:
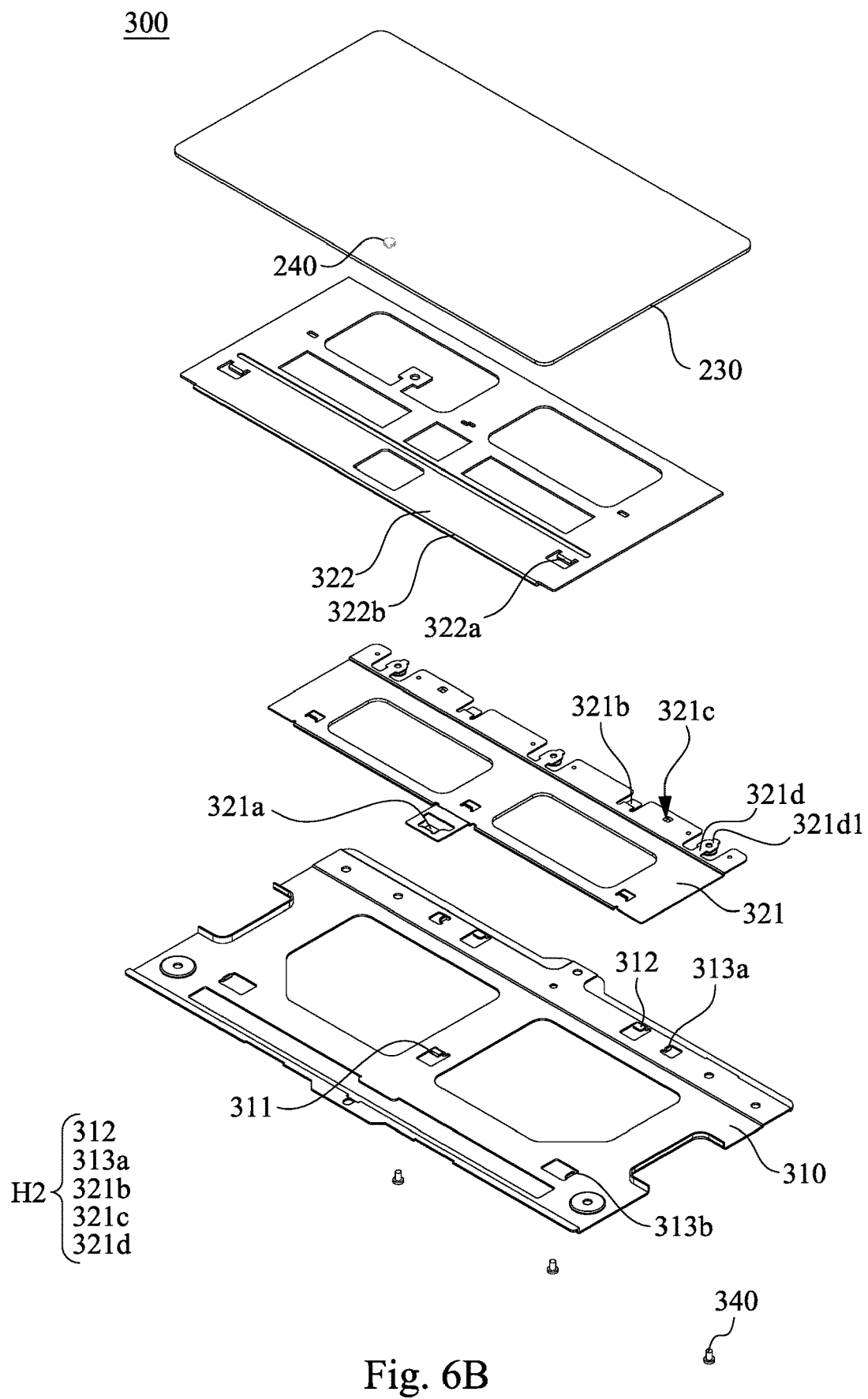
FIG. 6B is an exploded view of the touchpad device in FIG. 6A.
Figure 7:
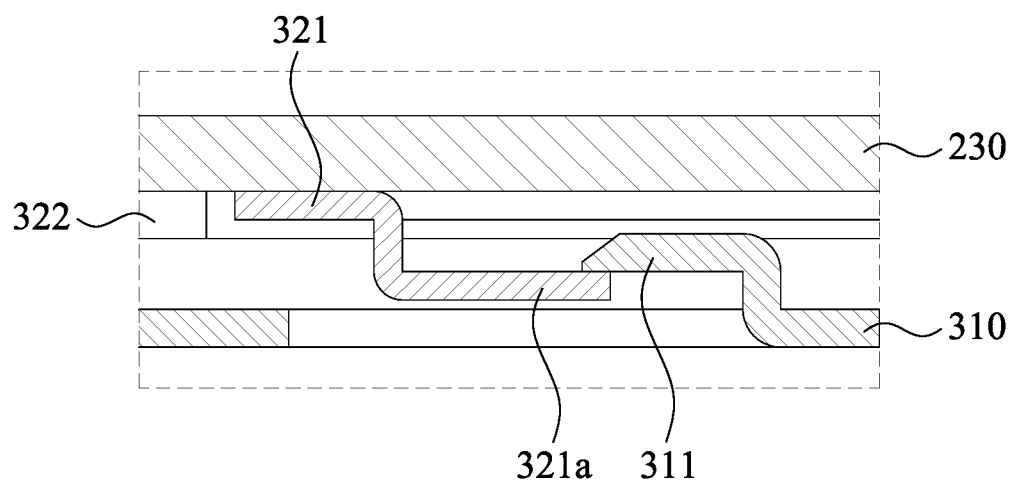
FIG. 7 is a partial cross-sectional view of the touchpad device in FIG. 6A taken along line 7-7.

Reference is made to FIGS. 6A, 6B, and 7. FIG. 6A is a perspective view of a touchpad device 300 according to an embodiment of the disclosure, in which the circuit board 230 is separated upward. FIG. 6B is an exploded view of the touchpad device 300 in FIG. 6A. FIG. 7 is a partial cross-sectional view of the touchpad device 300 in FIG. 6A taken along line 7-7. In the present embodiment, the touchpad device 300 includes a bottom board 310, a first supporting board 321, a second supporting board 322, the circuit board 230, and a metal dome 240. A first extending structure 311 is disposed on the bottom board 310. The first supporting board 321 is coupled to the bottom board 310 via a hinge structure H2 and is attached to the bottom side of the circuit board 230 adjacent to the bottom board 310. The second supporting board 322 is attached to the bottom side of the circuit board 230 adjacent to the bottom board 310. The first supporting board 321 is closer to the fixed side of the touchpad device 300 than the second supporting board 322, that is, the second supporting board 322 is closer to the movable side of the touchpad device 300 than the first supporting board 321. The hinge structure H2 includes a plurality of first abutting portions 312 and a plurality of first retaining portions 313a disposed on the bottom board 310, and includes a plurality of second abutting portions 321b and a plurality of second retaining portions 321c disposed on the first supporting board 321. The touchpad device 300 further includes a plurality of third retaining portions 313b disposed on the bottom board 310 and a plurality of fourth retaining portions 322a disposed on the second supporting board 322. The fourth retaining portions 322a are disposed on the second supporting board 322 and arranged with the third retaining portions 313b in a direction substantially parallel to the bottom board 310 or the second supporting board 322. Hence, the combinations of the third retaining portions 313b and the fourth retaining portions 322a can position the second supporting board 322 and the circuit board 230 thereon relative to the bottom board 310 in the horizontal direction on the movable side of the touchpad device 300. The second supporting board 322 includes a reverse bending portion 322b. The hinge structure H2 and the reverse bending portion 322b are respectively located at opposite two edges of the bottom board 310. Although the components in this paragraph with the same names as the embodiment shown in FIG. 2A may have some slight differences in shape and position in FIGS. 6A to 7, the functions provided by these components are substantially the same or similar. Therefore, the introductions of these components can be referred to the relevant contents above and will not be repeated here.

It should be pointed out that one difference between the present embodiment and the embodiment shown in FIG. 2A is that the present embodiment includes the first supporting board 321 and the second supporting board 322. Specifically, the second supporting board 322 is partially overlapped between the circuit board 230 and the first supporting board 321. Hence, the touchpad device 300 of the present embodiment can further obtain better rigidity at the overlap between the first supporting board 321 and the second supporting board 322.

Another difference between the present embodiment and the embodiment shown in FIG. 2A is that the hinge structure H2 of the present embodiment includes a cantilever 321d and a fastening member 340. The cantilever 321d is connected to the first supporting board 321 and includes a fixing portion 321d1. The fixing portion 321d1 is located at a distal end of the cantilever 321d and fixed to the bottom board 310 through the fastening member 340. Hence, it can further increase the stability of the hinge structure H2 connected between the first supporting board 321 and the bottom board 310.

In some embodiments, the first supporting board 321 and the second supporting board 322 can be fixed to each other by adhesive, liquid glue, or laser spot welding, but the disclosure is not limited in this regard.

Figure 8A:
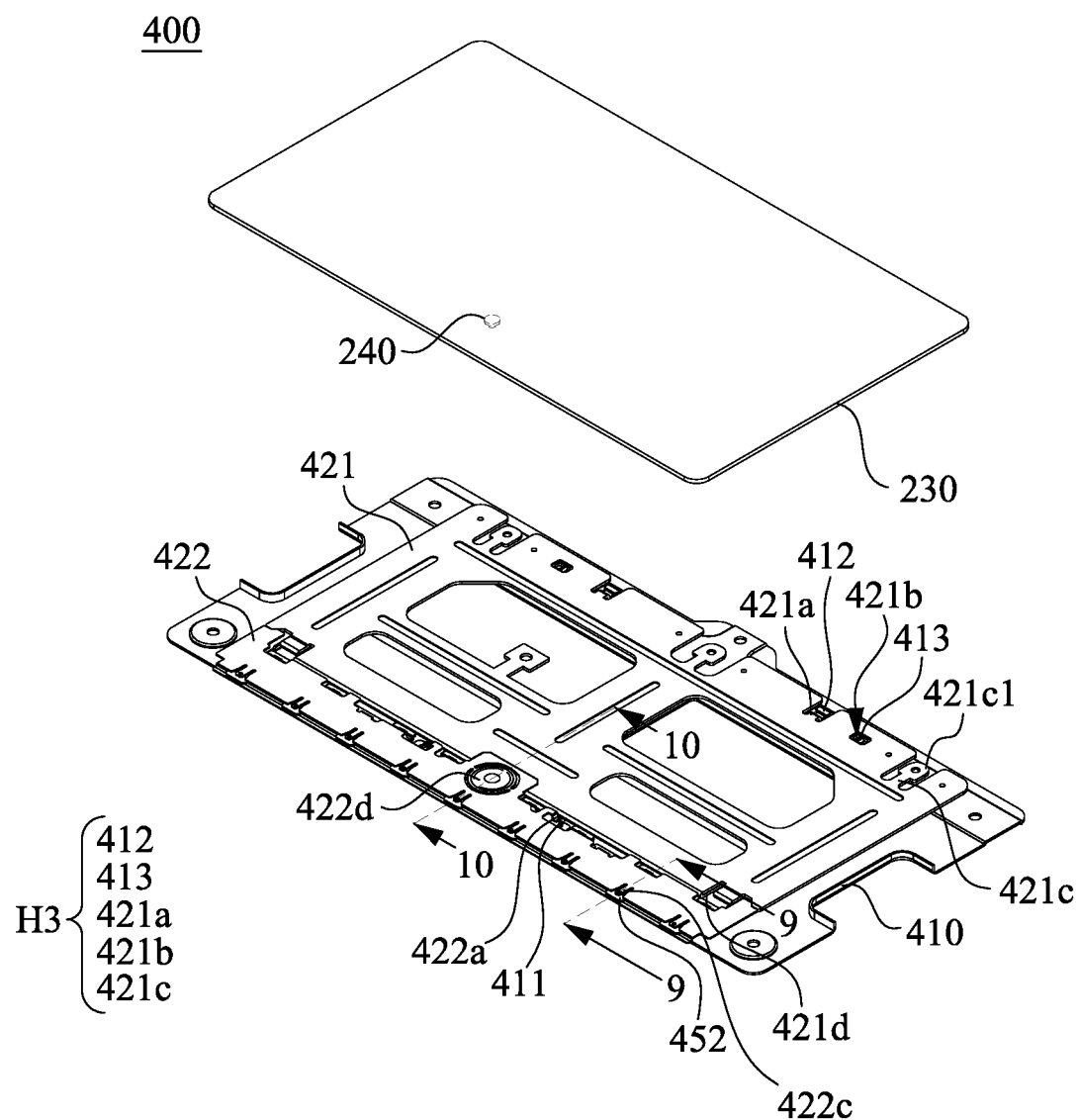
FIG. 8A is a perspective view of a touchpad device according to an embodiment of the disclosure, in which a circuit board is separated upward.
Figure 8B:
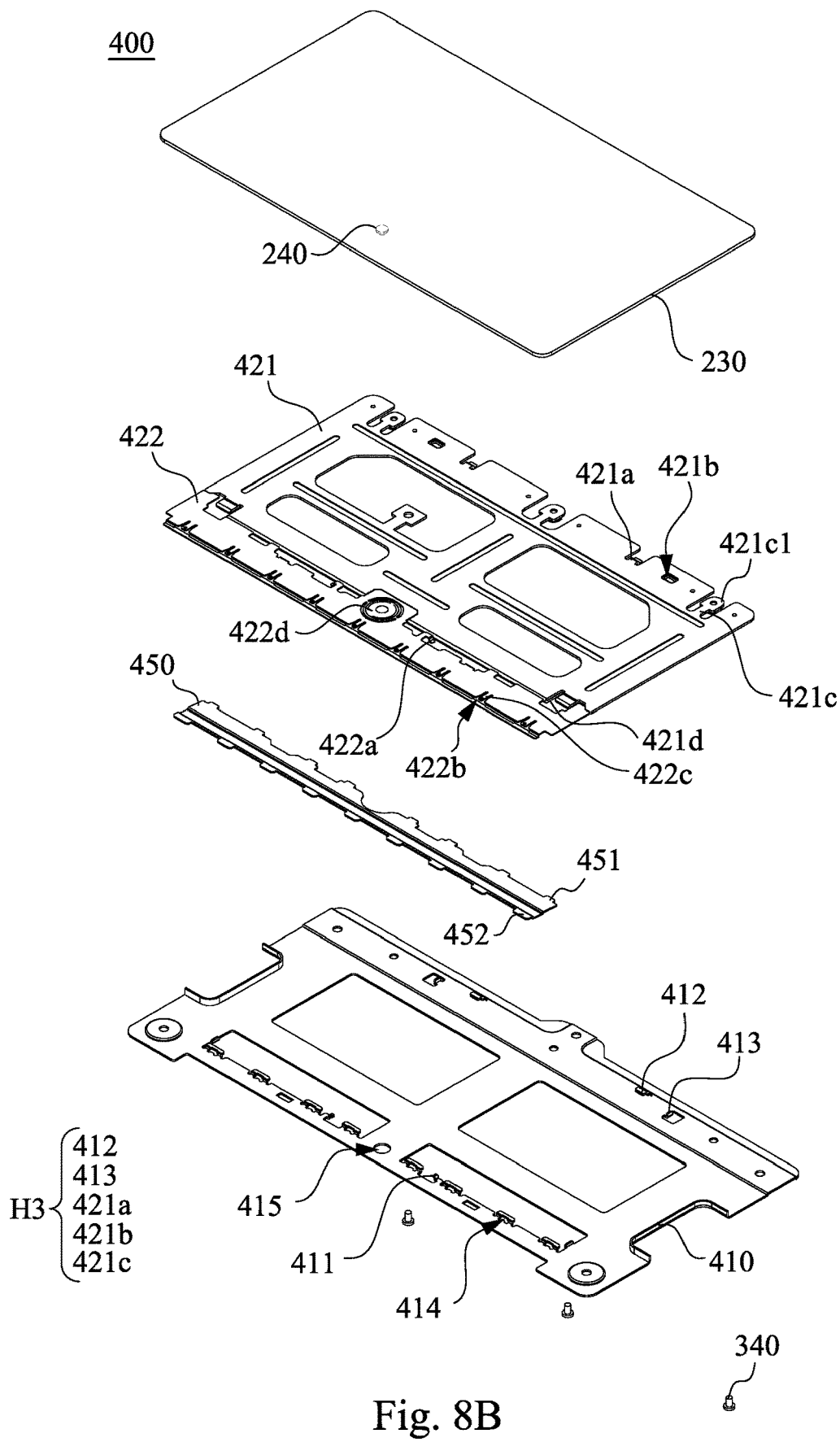
FIG. 8B is an exploded view of the touchpad device in FIG. 8A.

Reference is made to FIGS. 8A and 8B. FIG. 8A is a perspective view of a touchpad device 400 according to an embodiment of the disclosure, in which the circuit board 230 is separated upward. FIG. 8B is an exploded view of the touchpad device 400 in FIG. 8A. In the present embodiment, the touchpad device 400 includes a bottom board 410, a first supporting board 421, a second supporting board 422, the circuit board 230, and a metal dome 240. A first extending structure 411 is disposed on the bottom board 410. A second extending structure 422a is disposed on the second supporting board 422. The first supporting board 421 is coupled to the bottom board 410 via a hinge structure H3 and is attached to the bottom side of the circuit board 230 adjacent to the bottom board 410. The second supporting board 422 is attached to the bottom side of the circuit board 230 adjacent to the bottom board 410. The first supporting board 421 is closer to the fixed side of the touchpad device 400 than the second supporting board 422, that is, the second supporting board 422 is closer to the movable side of the touchpad device 400 than the first supporting board 421. The hinge structure H3 includes a plurality of first abutting portions 412 and a plurality of first retaining portions 413 disposed on the bottom board 410, and includes a plurality of second abutting portions 421a, a plurality of second retaining portions 421b disposed on the first supporting board 421, and a cantilever 421c including a fixing portion 421c1. The first supporting board 421 includes a reverse bending portion 421d. The hinge structure H3 and the reverse bending portion 421d are respectively located at opposite two edges of the bottom board 410. Although the components in this paragraph with the same names as the embodiment shown in FIG. 6A may have some slight differences in shape and position in FIGS. 8A and 8B, the functions provided by these components are substantially the same or similar. Therefore, the introductions of these components can be referred to the relevant contents above and will not be repeated here.

The differences between the present embodiment and the embodiment shown in FIG. 6A are described below.

In the present embodiment, the first supporting board 421 and the second supporting board 422 are arranged side by side in a direction substantially parallel to the circuit board 230 without overlapping. The first supporting board 421 and the second supporting board 422 can be made of different materials. For example, the material of the first supporting board 421 includes plastic, and the material of the second supporting board 422 includes metal, but the disclosure is not limited in this regard. Hence, the touchpad device 400 of the present embodiment can obtain the expected rigidity at the areas of the first supporting board 421 and the second supporting board 422 respectively.

In the present embodiment, the touchpad device 400 further includes a linkage 450. The linkage 450 includes a plurality of first engaging portions 451 and a plurality of second engaging portions 452 respectively located at opposite two sides of the linkage 450. The first engaging portions 451 are engaged with the bottom board 410. The second engaging portions 452 are engaged with the second supporting board 422. The linkage 450 is engaged between the bottom board 410 and the second supporting board 422 at the movable side of the touchpad device 400. By disposing the linkage 450 engaging the bottom board 410 and the second supporting board 422 at the movable side of the touchpad device 400, the problem of deformation or insufficient rigidity of components can be improved.

In some embodiments, the linkage 450 is a flat pressing piece, and the first engaging portions 451 and the second engaging portions 452 at the opposite two sides are arranged in a zigzag shape, but the disclosure is not limited in this regard.

Figure 9:
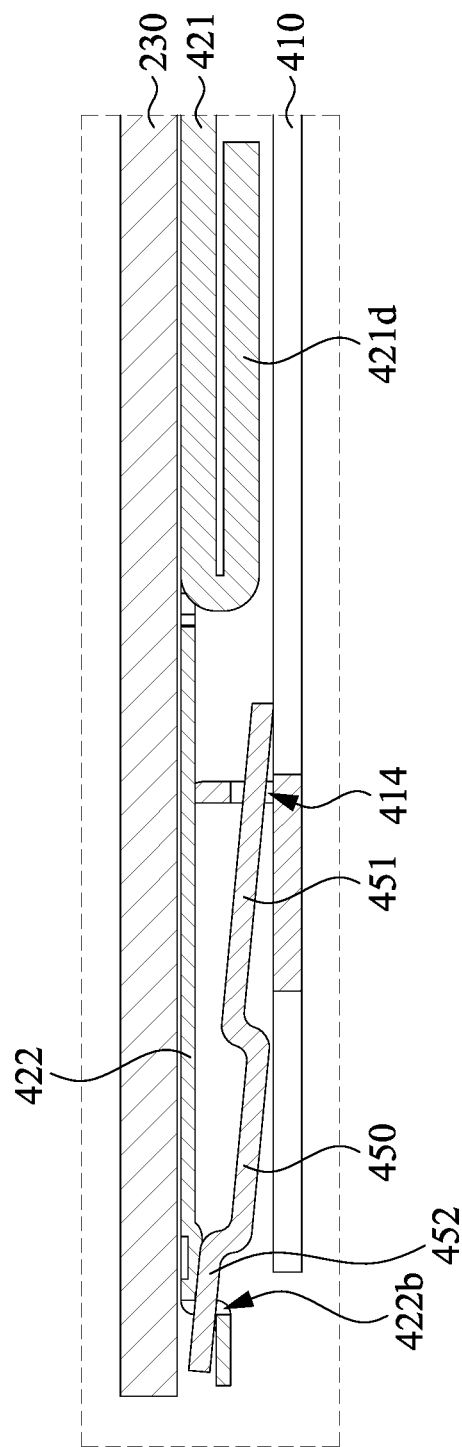
FIG. 9 is a partial cross-sectional view of the touchpad device in FIG. 8A taken along line 9-9.

Reference is made to FIG. 9. FIG. 9 is a partial cross-sectional view of the touchpad device 400 in FIG. 8A taken along line 9-9. In the present embodiment, the bottom board 410 has a plurality of engaging holes 414. The first engaging portions 451 are respectively engaged with the engaging holes 414. The second supporting board 422 has a plurality of engaging holes 422b. The second engaging portions 452 are respectively engaged with the engaging holes 422b. Hence, when the circuit board 230 is pressed toward the bottom board 410, the linkage 450 can assist the circuit board 230 via the second supporting board 422, so as to improve the problem of deformation or insufficient rigidity of components.

In addition, as shown in FIG. 8B, the second supporting board 422 further includes a plurality of pressing arms 422c. The pressing arms 422c respectively press the second engaging portions 452. Hence, the impact noise between the linkage 450 and the second supporting board 422 can be eliminated.

Figure 10:
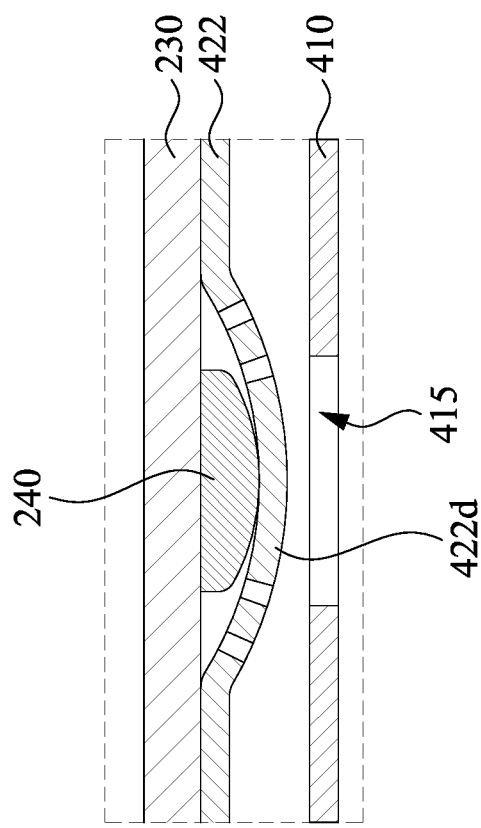
FIG. 10 is a partial cross-sectional view of the touchpad device in FIG. 8A taken along line 10-10.

Reference is made to FIG. 10. FIG. 10 is a partial cross-sectional view of the touchpad device 400 in FIG. 8A taken along line 10-10. As shown in FIGS. 8A and 10, the second supporting board 422 includes a buffering cover 422d. The buffering cover 422d protrudes away from the circuit board 230 and covers the metal dome 240. Hence, when the circuit board 230 is pressed toward the bottom board 410, the buffering cover 422d can reduce the rebound sound of the metal dome 240.

In practical applications, the buffering cover 422d may be an easily deformable region formed by a plurality of hollow portions made by the second supporting board 422 through a stamping process. For example, the buffering cover 422d may include a plurality of concentric ribs that are ring-shaped and connected to each other, but the disclosure is not limited in this regard.

In addition, in some embodiments, as shown in FIG. 10, the bottom board 410 has a through hole 415. The buffering cover 422d of the second supporting board 422 is located between the metal dome 240 and the through hole 415. Hence, the through hole 415 can reduce the impact sound of pressing.

According to the foregoing recitations of the embodiments of the disclosure, it can be seen that in the touchpad device of the present disclosure, by using extending structures respectively disposed on the bottom board and the supporting board as height-limiting structures, the gap between the bottom board and the supporting board can be controlled, and the problem of uneven force caused by deformation of components can be reduced. By designing the extending structures as elastic arm structures, the problem of excessive stress of the metal dome can also be alleviated, thereby improving the pressing feeling at the area of the metal dome. By designing the abutting portions of the hinge structure respectively disposed on the bottom board and the supporting board as elastic arm structures, the problem of the gap between the bottom board and the supporting board, the problem of noise, and the problem of the pressing feeling can be improved. By providing the linkage to engage the bottom board and the supporting board at the movable side of the touchpad device, the problem of deformation or insufficient rigidity of components can be improved. By designing the pressing arm on the supporting board to abut against the linkage, the impact noise between the linkage and the supporting board can be eliminated. By designing the buffering cover on the supporting board to cover the metal dome, the rebound sound of the metal dome can be reduced. By arranging the through hole on the bottom board to directly face the buffering cover, the impact sound of pressing can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touchpad device, comprising:
   a bottom board configured to be fixed to a housing;
   at least one supporting board coupled to the bottom board and configured to swing relative to the bottom board;
   a circuit board attached to a side of the at least one supporting board away from the bottom board;
   a first extending structure disposed on the bottom board and extending toward the at least one supporting board; and
   a second extending structure disposed on the at least one supporting board and extending toward the bottom board,
   wherein the first extending structure partially extends to a side of the second extending structure adjacent to the at least one supporting board, or the second extending structure partially extends to a side of the first extending structure adjacent to the bottom board,
   wherein the at least one supporting board comprises a reverse bending portion, the touchpad device further comprises a hinge structure connected between the bottom board and the at least one supporting board, and the hinge structure and the reverse bending portion are respectively located at opposite two edges of the at least one supporting board.

2. The touchpad device of claim 1, wherein at least one of the first extending structure and the second extending structure is an elastic arm structure.

3. The touchpad device of claim 1, wherein the hinge structure comprises:
   a first abutting portion disposed on the bottom board and extending toward the at least one supporting board; and
   a second abutting portion disposed on the at least one supporting board and extending toward the bottom board,
   wherein the first abutting portion abuts against a side of the second abutting portion adjacent to the at least one supporting board, and the second abutting portion abuts against a side of the first abutting portion adjacent to the bottom board.

4. The touchpad device of claim 3, wherein at least one of the first abutting portion and the second abutting portion is an elastic arm structure.

5. The touchpad device of claim 1, further comprising:
   a first retaining portion disposed on the bottom board; and
   a second retaining portion disposed on the at least one supporting board and arranged with the first retaining portion in a direction substantially parallel to the bottom board or the at least one supporting board.

6. The touchpad device of claim 1, wherein the at least one supporting board comprises:
   a first supporting board coupled to the bottom board and attached to a side of the circuit board adjacent to the bottom board; and
   a second supporting board attached to the side of the circuit board adjacent to the bottom board.

7. The touchpad device of claim 6, wherein the second supporting board is partially overlapped between the circuit board and the first supporting board.

8. The touchpad device of claim 6, wherein the first supporting board and the second supporting board are arranged side by side in a direction substantially parallel to the circuit board.

9. The touchpad device of claim 6, wherein one of the first supporting board and the second supporting board comprises the reverse bending portion.

10. The touchpad device of claim 9, wherein the hinge structure is connected between the bottom board and the first supporting board, and the hinge structure and the reverse bending portion are respectively adjacent to opposite two edges of the bottom board.

11. The touchpad device of claim 1, wherein the hinge structure comprises:
    a cantilever connected to the at least one supporting board and comprising a fixing portion, wherein the fixing portion is located at a distal end of the cantilever and fixed to the bottom board.

12. The touchpad device of claim 11, wherein the hinge structure further comprises:
    a fastening member fastening the fixing portion and the bottom board.

13. The touchpad device of claim 1, further comprising:
    a linkage comprising a plurality of first engaging portions and a plurality of second engaging portions respectively located at opposite two sides of the linkage, the first engaging portions being engaged with the bottom board, the second engaging portions being engaged with the at least one supporting board.

14. The touchpad device of claim 13, wherein the bottom board has a plurality of engaging holes, and the first engaging portions are respectively engaged with the engaging holes.

15. The touchpad device of claim 13, wherein the at least one supporting board has a plurality of engaging holes, and the second engaging portions are respectively engaged with the engaging holes.

16. The touchpad device of claim 15, wherein the at least one supporting board further comprises a plurality of pressing arms respectively pressing the second engaging portions.

17. The touchpad device of claim 1, wherein a metal dome is disposed on the circuit board, the at least one supporting board comprises a buffering cover, and the buffering cover protrudes away from the circuit board and covers the metal dome.

18. The touchpad device of claim 17, wherein the bottom board has a through hole, and the buffering cover is located between the metal dome and the through hole.

\* \* \* \* \*